Figure 1:
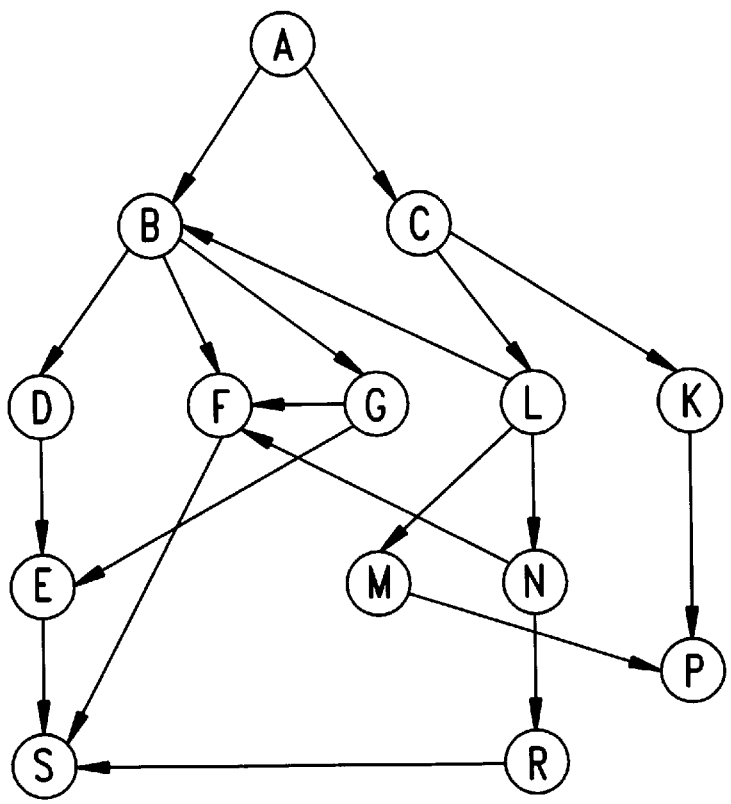

United States Patent

Olgac

[11] Patent Number: 5,878,407
[45] Date of Patent: Mar. 2, 1999

[54] STORAGE OF A GRAPH

[75] Inventor: Enis Olgac, Böblingen, Germany

[73] Assignee: International Business Machines Corporation, Armonk, N.Y.

[21] Appl. No.: 750,887
[22] PCT Filed: Apr. 18, 1995
[86] PCT No.: PCT/EP95/01450
 § 371 Date: Dec. 17, 1996
 § 102(e) Date: Dec. 17, 1996
[87] PCT Pub. No.: WO96/33470
 PCT Pub. Date: Oct. 24, 1996
[51] Int. Cl.⁶ .................................................. G06F 17/30
[52] U.S. Cl. ............................................ 707/1; 345/333
[58] Field of Search ..................... 707/1, 2, 3, 4, 707/5, 6, 7, 8, 9, 10, 100, 200; 395/500, 183.08; 364/578; 371/27.1, 67.1; 345/326, 333

[56] References Cited

U.S. PATENT DOCUMENTS

| | | | |
|---|---|---|---|
| 5,163,016 | 11/1992 | Har'El et al. | 364/578 |
| 5,257,363 | 10/1993 | Shapiro et al. | 395/500 |
| 5,553,206 | 9/1996 | Meshkat | 345/423 |
| 5,555,270 | 9/1996 | Sun et al. | 371/27.1 |
| 5,630,051 | 5/1997 | Sun et al. | 395/183.08 |
| 5,649,165 | 7/1997 | Jain et al. | 395/500 |

Primary Examiner—Thomas G. Black
Assistant Examiner—Ruay Lian Ho
Attorney, Agent, or Firm—Ronald L. Drumheller

[57] ABSTRACT

The invention relates to a method to store a graph G in a memory of a computer system by a number of depth-first and breadth-first searches in different directions. The entire topological information contained in the graph is mapped into the memory. At the same time redundant information is eliminated.

14 Claims, 22 Drawing Sheets

Example Graph:

Vertices: ( A B C D E F G K L M N P R S )

Edges : (
  (A,B) (A,C) (B,D) (B,F) (B,G) (C,L) (C,K) (D,E) (E,S) (F,S)
  (G,E) (G,F) (K,P) (L,B) (L,M) (L,N) (M,P) (N,F) (N,R)
  (P,R) (R,S)
 )

Sources : ( A )
Sinks  : ( S )

Example Graph:

Vertices: ( A B C D E F G K L M N P R S )

Edges : (
  (A,B) (A,C) (B,D) (B,F) (B,G) (C,L) (C,K) (D,E) (E,S) (F,S)
  (G,E) (G,F) (K,P) (L,B) (L,M) (L,N) (M,P) (N,F) (N,R)
  (P,R) (R,S)
)

Sources : ( A )

Sinks : ( S )

FIG.2A

Data Structures: (Initial)

Pre-Clock     =   0      ;
Post-Clock    =   15     ;
Current-Vertex =         ;
Stack         =  < A >   ;

| Vertex | Successors | Pre-Order | Post-Order |
|--------|------------|-----------|------------|
| A | < + B C > | 0 | 0 |
| B | < + D F G > | 0 | 0 |
| C | < + K L > | 0 | 0 |
| D | < + E > | 0 | 0 |
| E | < + S > | 0 | 0 |
| F | < + S > | 0 | 0 |
| G | < + E F > | 0 | 0 |
| K | < + P > | 0 | 0 |
| L | < + B M N > | 0 | 0 |
| M | < + P > | 0 | 0 |
| N | < + F R > | 0 | 0 |
| P | < + R > | 0 | 0 |
| R | < + S > | 0 | 0 |
| S | < + > | 0 | 0 |

FIG.2B

FIG.2Ba

```
2. Current-Vertex = A
4. Pre-Clock     = 1
   Pre-Order(A)  = 1
6. Stack         = < B A >
   Successors(A) = < B + C >
2. Current-Vertex = B
4. Pre-Clock     = 2
   Pre-Order(B)  = 2
6. Stack         = < D B A >
   Successors(B) = < D + F G >
2. Current-Vertex = D
4. Pre-Clock     = 3
   Pre-Order(D)  = 3
6. Stack         = < E D B A >
   Successors(D) = < E + >
2. Current-Vertex = E
4. Pre-Clock     = 4
   Pre-Order(E)  = 4
6. Stack         = < S E D B A >
   Successors(E) = < S + >
2. Current-Vertex = S
4. Pre-Clock     = 5
   Pre-Order(S)  = 5
5. Post-Clock    = 14
   Post-Order(S) = 14
   Stack         = < E D B A >
2. Current-Vertex = E
5. Post-Clock    = 13
   Post-Order(E) = 13
   Stack         = < D B A >
2. Current-Vertex = D
5. Post-Clock    = 12
   Post-Order(D) = 12
   Stack         = < B A >
2. Current-Vertex = B
6. Stack         = < F B A >
   Successors(B) = < D F + G >
2. Current-Vertex = F
4. Pre-Clock     = 6
   Pre_order(F)  = 6
7. Successors(F) = < S + >
5. Post-Clock    = 11
   Post-Order(F) = 11
   Stack         = < B A >
```

FIG.2Bb

```
                          ↓
         2. Current-Vertex = B
         6. Stack          = < G B A >
            Successors(B)  = < D F G + >
         2. Current-Vertex = G
         4. Pre-Clock      = 7
            Pre_order(G)   = 7
         7. Successors(G)  = < E + F >
         7. Successors(G)  = < E F + >
         5. Post-Clock     = 10
            Post-Order(G)  = 10
            Stack          = < B A >
         2. Current-Vertex = B
         5. Post-Clock     = 9
            Post-Order(G)  = 9
            Stack          = < A >
         2. Current-Vertex = A
            Stack          = < C A >
            Successors(A)  = < B C + >
         2. Current-Vertex = C
         4. Pre-Clock      = 8
            Pre_order(C)   = 8
         6. Stack          = < K C A >
            Successors(C)  = < K + L >
         2. Current-Vertex = K
         4. Pre-Clock      = 9
            Pre_order(K)   = 9
         6. Stack          = < P K C A >
            Successors(K)  = < P + >
         2. Current-Vertex = P
         4. Pre-Clock      = 10
            Pre_order(P)   = 10
         6. Stack          = < R P K C A >
            Successors(P)  = < R + >
         2. Current-Vertex = R
         4. Pre-Clock      = 11
            Pre_order(R)   = 11
         7. Successors(R)  = < S + >
         5. Post-Clock     = 8
            Post-Order(R)  = 8
            Stack          = < P K C A >
         2. Current-Vertex = P
         5. Post-Clock     = 7
            Post-Order(P)  = 7
            Stack          = < K C A >
                          ↓
```

FIG.2Bb

FIG.2Bc

```
              ↓
   2. Current-Vertex = K
   5. Post-Clock    = 6
      Post-Order(K) = 6
      Stack         = < C A >
   2. Current-Vertex = C
      Stack         = < L C A >
      Successors(C) = < K L + >
   2. Current-Vertex = L
      Pre-Clock     = 12
      Pre_order(L)  = 12
   7. Successors(L) = < B + M N >
   6. Stack         = < M L C A >
      Successors(L) = < B M + N >
   2. Current-Vertex = M
   4. Pre-Clock     = 13
      Pre_order(M)  = 13
   7. Successors(M) = < P + >
   5. Post-Clock    = 5
      Post-Order(M) = 5
      Stack         = < L C A >
   2. Current-Vertex = L
   6. Stack         = < N L C A >
      Successors(L) = < M N + >
   2. Current-Vertex = N
   4. Pre-Clock     = 14
      Pre_order(N)  = 14
   7. Successors(N) = < F + R >
   7. Successors(N) = < F R + >
   5. Post-Clock    = 4
      Post-Order(N) = 4
      Stack         = < L C A >
   2. Current-Vertex = L
   5. Post-Clock    = 3
      Post-Order(L) = 3
      Stack         = < C A >
   2. Current-Vertex = C
   5. Post-Clock    = 2
      Post-Order(C) = 2
      Stack         = < A >
   2. Current-Vertex = A
   5. Post-Clock    = 1
      Post-Order(C) = 1
      Stack         = <>
   1. Go to 8
   8. Stop
```

Data Structures: (After Step 1)
```
Pre-Clock      =  14  ;
Post-Clock     =   1  ;
Current-Vertex =   A  ;
Stack          =  <>  ;
```

FIG.2C

| Vertex | Successors | Pre-Order | Post-Order |
|---|---|---|---|
| A | < B C   + > | 1 | 1 |
| B | < D F G + > | 2 | 9 |
| C | < K L   + > | 8 | 2 |
| D | < E     + > | 3 | 12 |
| E | < S     + > | 4 | 13 |
| F | < S     + > | 6 | 11 |
| G | < E F   + > | 7 | 10 |
| K | < P     + > | 9 | 6 |
| L | < B M N + > | 12 | 3 |
| M | < P     + > | 13 | 5 |
| N | < F R   + > | 14 | 4 |
| P | < R     + > | 10 | 7 |
| R | < S     + > | 11 | 8 |
| S | <       + > | 5 | 14 |

Data Structures: (Initial)
```
Proc-Clock     =  0   ;
Current-Vertex =      ;
Queue          = < A > ;
```

FIG.2D

| Vertex | Successors | Processing-Order | State |
|---|---|---|---|
| A | < + B C   > | 0 | white |
| B | < + D F G > | 0 | white |
| C | < + K L   > | 0 | white |
| D | < + E     > | 0 | white |
| E | < + S     > | 0 | white |
| F | < + S     > | 0 | white |
| G | < + E F   > | 0 | white |
| K | < + P     > | 0 | white |
| L | < + B M N > | 0 | white |
| M | < + P     > | 0 | white |
| N | < + F R   > | 0 | white |
| P | < + R     > | 0 | white |
| R | < + S     > | 0 | white |
| S | < +       > | 0 | white |

FIG.2E

Figure 2E:

| FIG. 2Ea |
| FIG. 2Eb |
| FIG. 2Ec |

FIG.2Ea

```
1. State(A)              = black
3. Current-Vertex        = A
   Proc-Clock            = 1
   Processing-Order(A)   = 1
5. Queue                 = < A B >
   State(B)              = black
   Successors(A)         = < B + C >
5. Queue                 = < A B C >
   State(C)              = black
   Successors(A)         = < B C + >
4. Queue                 = < B C >
3. Current-Vertex        = B
   Proc-Clock            = 2
   Processing-Order(B)   = 2
5. Queue                 = < B C D >
   State(D)              = black
   Successors(B)         = < D + F G >
5. Queue                 = < B C D F >
   State(F)              = black
   Successors(B)         = < D F + G >
5. Queue                 = < B C D F G >
   State(G)              = black
   Successors(B)         = < D F G + >
4. Queue                 = < C D F G >
3. Current-Vertex        = C
   Proc-Clock            = 3
   Processing-Order(C)   = 3
5. Queue                 = < C D F G K >
   State(K)              = black
   Successors(C)         = < K + L >
5. Queue                 = < C D F G K L >
   State(L)              = black
   Successors(C)         = < K L + >
4. Queue                 = < D F G K L >
3. Current-Vertex        = D
   Proc-Clock            = 4
   Processing-Order(D)   = 4
5. Queue                 = < D F G K L E >
   State(E)              = black
   Successors(D)         = < E + >
4. Queue                 = < F G K L E >
3. Current-Vertex        = F
   Proc-Clock            = 5
   Processing-Order(F)   = 5
```

```
5. Queue                  = < F G K L E S >
   State(S)               = black
   Successors(F)          = < S + >
4. Queue                  = < G K L E S >
3. Current-Vertex         = G
   Proc-Clock             = 6
   Processing-Order(G)    = 6
6. Successors(G)          = < E + F >
6. Successors(G)          = < E F + >
4. Queue                  = < K L E S >
3. Current-Vertex         = K
   Proc-Clock             = 7
   Processing-Order(K)    = 7
5. Queue                  = < K L E S P >
   State(P)               = black
   Successors(K)          = < P + >
4. Queue                  = < L E S P >
3. Current-Vertex         = L
   Proc-Clock             = 8
   Processing-Order(K)    = 8
   Successors(L)          = < B + M N >
   Queue                  = < L E S P M >
   State(M)               = black
   Successors(L)          = < B M + N >
5. Queue                  = < L E S P M N >
   State(N)               = black
   Successors(L)          = < B M N + >
4. Queue                  = < E S P M N >
3. Current-Vertex         = E
   Proc-Clock             = 9
   Processing-Order(K)    = 9
6. Successors(E)          = < S + >
4. Queue                  = < S P M N >
3. Current-Vertex         = E
   Proc-Clock             = 10
   Processing-Order(K)    = 10
4. Queue                  = < P M N >
3. Current-Vertex         = P
   Proc-Clock             = 11
   Processing-Order(P)    = 11
```

FIG.2Eb

```
5. Queue                  = < P M N R >
   State(R)               =   black
   Successors(P)          = < R + >
4. Queue                  = < M N R >
3. Current-Vertex         = M
   Proc-Clock             = 12
   Processing-Order(M)    = 12
6. Successors(M)          = < P + >
4. Queue                  = < N R >
3. Current-Vertex         = N
   Proc-Clock             = 13
   Processing-Order(M)    = 13
6. Successors(N)          = < F + R >
6. Successors(N)          = < F R + >
4. Queue                  = < R >
3. Current-Vertex         = R
   Proc-Clock             = 14
   Processing-Order(R)    = 14
6. Successors(R)          = < S + >
4. Queue                  = <>
2. Go to 7
7. Stop
```

Data Structures: (After Step 2)

Proc-Clock = 14 ;
Current-Vertex = R ;
Queue = <> ;

FIG.2F

| Vertex | Successors | Processing-Order | State |
|---|---|---|---|
| A | < B C + > | 1 | black |
| B | < D F G + > | 2 | black |
| C | < K L + > | 3 | black |
| D | < E + > | 4 | black |
| E | < S + > | 9 | black |
| F | < S + > | 5 | black |
| G | < E F + > | 6 | black |
| K | < P + > | 7 | black |
| L | < B M N + > | 8 | black |
| M | < P + > | 12 | black |
| N | < F R + > | 13 | black |
| P | < R + > | 11 | black |
| R | < S + > | 14 | black |
| S | < + > | 10 | black |

Data Structures: (Initial)

Pre-Clock = 0 ;
Post-Clock = 0 ;
Current-Vertex = ;
Stack = < S > ;

FIG.2G

| Vertex | Predecessors | Pre-Order | Post-Order |
|---|---|---|---|
| A | < + > | 0 | 0 |
| B | < + A L > | 0 | 0 |
| C | < + A > | 0 | 0 |
| D | < + B > | 0 | 0 |
| E | < + D G > | 0 | 0 |
| F | < + B G N > | 0 | 0 |
| G | < + B > | 0 | 0 |
| K | < + C > | 0 | 0 |
| L | < + C > | 0 | 0 |
| M | < + L > | 0 | 0 |
| N | < + L > | 0 | 0 |
| P | < + K M > | 0 | 0 |
| R | < + P N > | 0 | 0 |
| S | < + F E R > | 0 | 0 |

FIG.2H

| FIG. 2Ha |
| FIG. 2Hb |
| FIG. 2Hc |

FIG.2Ha

```
2. Current-Vertex    = S
4. Pre-Clock         = 1
   Pre-Order(S)      = 1
6. Stack             = < F S >
   Predecessors(S)   = < F + E R >
2. Current-Vertex    = F
4. Pre-Clock         = 2
   Pre-Order(F)      = 2
6. Stack             = < B F S >
   Predecessors(F)   = < B + G N >
2. Current-Vertex    = B
4. Pre-Clock         = 3
   Pre-Order(B)      = 3
6. Stack             = < A B F S >
   Predecessors(B)   = < A + L >
2. Current-Vertex    = A
4. Pre-Clock         = 4
   Pre-Order(A)      = 4
5. Post-Clock        = 1
   Post-Order(A)     = 1
   Stack             = < B F S >
2. Current-Vertex    = B
6. Stack             = < L B F S >
   Predecessors(B)   = < A L + >
2. Current-Vertex    = L
4. Pre-Clock         = 5
   Pre-Order(L)      = 5
6. Stack             = < C L B F S >
   Predecessors(L)   = < C + >
2. Current-Vertex    = C
4. Pre-Clock         = 6
   Pre-Order(C)      = 6
7. Predecessors(C)   = < A + >
5. Post-Clock        = 2
   Post-Order(C)     = 2
   Stack             = < L B F S >
2. Current-Vertex    = L
5. Post-Clock        = 3
   Post-Order(L)     = 3
   Stack             = < B F S >
2. Current-Vertex    = B
5. Post-Clock        = 4
   Post-Order(B)     = 4
   Stack             = < F S >
```

FIG.2Hb

```
                              ↓
2. Current-Vertex   = F
6. Stack            = < G F S >
   Predecessors(F)  = < B G + N >
2. Current-Vertex   = G
4. Pre-Clock        = 7
   Pre-Order(G)     = 7
   Predecessors(G)  = < B + >
5. Post-Clock       = 5
   Post-Order(G)    = 5
   Stack            = < F S >
2. Current-Vertex   = F
6. Stack            = < N F S >
   Predecessors(F)  = < B G N + >
2. Current-Vertex   = N
4. Pre-Clock        = 8
   Pre-Order(N)     = 8
7. Predecessors(N)  = < L + >
5. Post-Clock       = 6
   Post-Order(N)    = 6
   Stack            = < F S >
2. Current-Vertex   = F
5. Post-Clock       = 7
   Post-Order(F)    = 7
   Stack            = < S >
2. Current-Vertex   = S
6. Stack            = < E S >
   Predecessors(S)  = < F E + R >
2. Current-Vertex   = E
4. Pre-Clock        = 9
   Pre-Order(E)     = 9
6. Stack            = < D E S >
   Predecessors(E)  = < D + >
2. Current-Vertex   = D
4. Pre-Clock        = 10
   Pre-Order(D)     = 10
7. Predecessors(D)  = < B + >
5. Post-Clock       = 8
   Post-Order(D)    = 8
   Stack            = < E S >
2. Current-Vertex   = E
5. Post-Clock       = 9
   Post-Order(E)    = 9
   Stack            = < S >
                              ↓
```

FIG.2Hc

```
                            ↓
      2. Current-Vertex    = S
      6. Stack             = < R S >
         Predecessors(S)   = < F E R + >
      2. Current-Vertex    = R
      4. Pre-Clock         = 11
         Pre-Order(R)      = 11
      7. Predecessors(R)   = < N + P >
      6. Stack             = < P R S >
         Predecessors(R)   = < N R + >
      2. Current-Vertex    = P
      4. Pre-Clock         = 12
         Pre-Order(P)      = 12
      6. Stack             = < K P R S >
         Predecessors(P)   = < K + M >
      2. Current-Vertex    = K
      4. Pre-Clock         = 13
         Pre-Order(K)      = 13
      7. Predecessors(K)   = < C + >
      5. Post-Clock        = 10
         Post-Order(K)     = 10
         Stack             = < P R S >
      2. Current-Vertex    = P
      6. Stack             = < M P R S >
         Predecessors(P)   = < K M + >
      2. Current-Vertex    = M
      4. Pre-Clock         = 14
         Pre-Order(M)      = 14
      7. Predecessors(M)   = < L + >
      5. Post-Clock        = 11
         Post-Order(M)     = 11
         Stack             = < P R S >
      2. Current-Vertex    = P
      5. Post-Clock        = 12
         Post-Order(M)     = 12
         Stack             = < R S >
      2. Current-Vertex    = R
      5. Post-Clock        = 13
         Post-Order(M)     = 13
         Stack             = < S >
      2. Current-Vertex    = S
      5. Post-Clock        = 14
         Post-Order(M)     = 14
         Stack             = <>
      1. Go to 8
      8. Stop
```

Data Structures: (After Step 3)

Pre-Clock = 14 ;
Proc-Clock = 14 ;
Current-Vertex = S ;
Stack = <> ;

FIG.2I

| Vertex | Predecessors | Pre-Order | Post-Order |
|---|---|---|---|
| A | <     + > | 4 | 1 |
| B | < A L + > | 3 | 4 |
| C | < A   + > | 6 | 2 |
| D | < B   + > | 10 | 8 |
| E | < D G + > | 9 | 9 |
| F | < B G N + > | 2 | 7 |
| G | < B   + > | 7 | 5 |
| K | < C   + > | 13 | 10 |
| L | < C   + > | 5 | 3 |
| M | < L   + > | 14 | 11 |
| N | < L   + > | 8 | 6 |
| P | < K M + > | 12 | 12 |
| R | < P N + > | 11 | 13 |
| S | < F E R + > | 1 | 14 |

Data Structures: (Initial)

Pre-Clock = 0 ;
Post-Clock = 15 ;
Current-Vertex = ;
Stack = < A > ;

FIG.2J

| Vertex | Successors | Pre-Order | Post-Order |
|---|---|---|---|
| A | < + C B   > | 0 | 0 |
| B | < + D G F > | 0 | 0 |
| C | < + K L   > | 0 | 0 |
| D | < + E     > | 0 | 0 |
| E | < + S     > | 0 | 0 |
| F | < + S     > | 0 | 0 |
| G | < + E F   > | 0 | 0 |
| K | < + P     > | 0 | 0 |
| L | < + M N B > | 0 | 0 |
| M | < + P     > | 0 | 0 |
| N | < + R F   > | 0 | 0 |
| P | < + R     > | 0 | 0 |
| R | < + S     > | 0 | 0 |
| S | < +       > | 0 | 0 |

FIG.2K

Data Structures: (After Step 4)

Pre-Clock = 14 ;
Post-Clock = 1 ;
Current-Vertex = A ;
Stack = <> ;

| Vertex | Successors | Pre-Order | Post-Order |
|---|---|---|---|
| A | < C B + > | 1 | 1 |
| B | < D G F + > | 11 | 4 |
| C | < K L + > | 2 | 2 |
| D | < E + > | 12 | 6 |
| E | < S + > | 13 | 7 |
| F | < S + > | 10 | 9 |
| G | < E F + > | 14 | 5 |
| K | < P + > | 3 | 11 |
| L | < M N B + > | 7 | 3 |
| M | < P + > | 8 | 10 |
| N | < R F + > | 9 | 8 |
| P | < R + > | 4 | 12 |
| R | < S + > | 5 | 13 |
| S | < + > | 6 | 14 |

FIG.2L

Data Structures: (Initial)

Pre-Clock = 0 ;
Post-Clock = 0 ;
Current-Vertex = ;
Stack = < S > ;

| Vertex | Predecessors | Pre-Order | Post-Order |
|---|---|---|---|
| A | < + > | 0 | 0 |
| B | < + L A > | 0 | 0 |
| C | < + A > | 0 | 0 |
| D | < + B > | 0 | 0 |
| E | < + D G > | 0 | 0 |
| F | < + N G B > | 0 | 0 |
| G | < + B > | 0 | 0 |
| K | < + C > | 0 | 0 |
| L | < + C > | 0 | 0 |
| M | < + L > | 0 | 0 |
| N | < + L > | 0 | 0 |
| P | < + K M > | 0 | 0 |
| R | < + P N > | 0 | 0 |
| S | < + R F E > | 0 | 0 |

Data Structures: (After Step 5)

Pre-Clock     = 14 ;
    Post-Clock    = 14 ;
    Current-Vertex = S ;
    Stack         = <> ;

| Vertex | Predecessors | Pre-Order | Post-Order |
|---|---|---|---|
| A | < + > | 6 | 1 |
| B | < + L A > | 12 | 9 |
| C | < + A > | 5 | 2 |
| D | < + B > | 14 | 12 |
| E | < + D G > | 13 | 13 |
| F | < + N G B > | 10 | 11 |
| G | < + B > | 11 | 10 |
| K | < + C > | 4 | 3 |
| L | < + C > | 8 | 4 |
| M | < + L > | 7 | 5 |
| N | < + L > | 9 | 7 |
| P | < + K M > | 3 | 6 |
| R | < + P N > | 2 | 8 |
| S | < + R F E > | 1 | 14 |

FIG.2M

Data Structures: (Initial)

Pre-Clock     = 0 ;
    Post-Clock    = 15 ;
    Current-Vertex = ;
    Stack         = < A > ;

| Vertex | Successors | Pre-Order | Post-Order |
|---|---|---|---|
| A | < + C B > | 0 | 0 |
| B | < + G F D > | 0 | 0 |
| C | < + K L > | 0 | 0 |
| D | < + E > | 0 | 0 |
| E | < + S > | 0 | 0 |
| F | < + S > | 0 | 0 |
| G | < + F E > | 0 | 0 |
| K | < + P > | 0 | 0 |
| L | < + M N B > | 0 | 0 |
| M | < + P > | 0 | 0 |
| N | < + R F > | 0 | 0 |
| P | < + R > | 0 | 0 |
| R | < + S > | 0 | 0 |
| S | < + > | 0 | 0 |

FIG.2N

FIG. 20

Data Structures: (After Step 6)

Pre-Clock = 14 ;
Post-Clock = 1 ;
Current-Vertex = A ;
Stack = <> ;

| Vertex | Successors | Pre-Order | Post-Order = BsIndex |
|---|---|---|---|
| A | < C B + > | 1 | 1 |
| B | < G F D + > | 11 | 4 |
| C | < K L + > | 2 | 2 |
| D | < E + > | 14 | 5 |
| E | < S + > | 13 | 7 |
| F | < S + > | 10 | 9 |
| G | < F E + > | 12 | 6 |
| K | < P + > | 3 | 11 |
| L | < M N + > | 7 | 3 |
| M | < P + > | 8 | 10 |
| N | < R F + > | 9 | 8 |
| P | < R + > | 4 | 12 |
| R | < S + > | 5 | 13 |
| S | < + > | 6 | 14 |

Data Structures: (Initial)

Pre-Clock = 0 ;
Post-Clock = 15 ;
Current-Vertex = ;
Stack = < A > ;

| Vertex | Successors | Pre-Order | Post-Order |
|---|---|---|---|
| A | < + C B > | 0 | 0 |
| B | < + D G F > | 0 | 0 |
| C | < + L K > | 0 | 0 |
| D | < + E > | 0 | 0 |
| E | < + S > | 0 | 0 |
| F | < + S > | 0 | 0 |
| G | < + E F > | 0 | 0 |
| K | < + P > | 0 | 0 |
| L | < + B N M > | 0 | 0 |
| M | < + P > | 0 | 0 |
| N | < + F R > | 0 | 0 |
| P | < + R > | 0 | 0 |
| R | < + S > | 0 | 0 |
| S | < + > | 0 | 0 |

FIG.3A

Data Structures: (After Step 7)

Pre-Clock = 14 ;
Post-Clock = 1 ;
Current-Vertex = A ;
Stack = <> ;

| Vertex | Successors | Pre-Order | Post-Order = FwdIndex |
|---|---|---|---|
| A | < C B + > | 1 | 1 |
| B | < D G F + > | 4 | 9 |
| C | < L K + > | 2 | 2 |
| D | < E + > | 5 | 12 |
| E | < S + > | 6 | 13 |
| F | < S + > | 9 | 11 |
| G | < E F + > | 8 | 10 |
| K | < P + > | 14 | 3 |
| L | < B N M + > | 3 | 4 |
| M | < P + > | 12 | 5 |
| N | < F R + > | 10 | 7 |
| P | < R + > | 13 | 6 |
| R | < S + > | 11 | 8 |
| S | < + > | 7 | 14 |

FIG.3B

Data Structures: (Initial)

Pre-Clock = 0 ;
Post-Clock = 0 ;
Current-Vertex = ;
Stack = < S > ;

FIG.4A

| Vertex | Predecessors | Pre-Order | Post-Order |
|---|---|---|---|
| A | < + > | 0 | 0 |
| B | < + L A > | 0 | 0 |
| C | < + A > | 0 | 0 |
| D | < + B > | 0 | 0 |
| E | < + G D > | 0 | 0 |
| F | < + N G B > | 0 | 0 |
| G | < + B > | 0 | 0 |
| K | < + C > | 0 | 0 |
| L | < + C > | 0 | 0 |
| M | < + L > | 0 | 0 |
| N | < + L > | 0 | 0 |
| P | < + K M > | 0 | 0 |
| R | < + P N > | 0 | 0 |
| S | < + R F E > | 0 | 0 |

Data Structures: (After Step 8)

Pre-Clock = 14 ;
Post-Clock = 14 ;
Current-Vertex = S ;
Stack = <> ;

FIG.4B

| Vertex | Predecessors | Pre-Order | Post-Order = BwdIndex |
|---|---|---|---|
| A | < + > | 6 | 1 |
| B | < + L A > | 12 | 9 |
| C | < + A > | 5 | 2 |
| D | < + B > | 14 | 12 |
| E | < + G D > | 13 | 13 |
| F | < + N G B > | 10 | 11 |
| G | < + B > | 11 | 10 |
| K | < + C > | 4 | 3 |
| L | < + C > | 8 | 4 |
| M | < + L > | 7 | 5 |
| N | < + L > | 9 | 7 |
| P | < + K M > | 3 | 6 |
| R | < + P N > | 2 | 8 |
| S | < + R F E > | 1 | 14 |

FIG.5

| BsIndex | Vertex | FwdIndex | BwdIndex |
|---------|--------|----------|----------|
| 1 | A | 1 | 1 |
| 2 | C | 2 | 2 |
| 3 | L | 4 | 4 |
| 4 | B | 9 | 9 |
| 5 | D | 12 | 12 |
| 6 | G | 10 | 10 |
| 7 | E | 13 | 13 |
| 8 | N | 7 | 7 |
| 9 | F | 11 | 11 |
| 10 | M | 5 | 5 |
| 11 | K | 3 | 3 |
| 12 | P | 6 | 6 |
| 13 | R | 8 | 8 |
| 14 | S | 14 | 14 |

| Base Index | Vertex | Forward Index | Backward Index |
| --- | --- | --- | --- |
| 1 | Vertex 6 | 1 | 1 |
| 2 | Vertex 11 | 2 | 2 |
| 3 | Vertex 12 | 11 | 11 |
| 4 | Vertex 1 | 3 | 3 |
| 5 | Vertex 2 | 10 | 10 |
| 6 | Vertex 13 | 12 | 12 |
| 7 | Vertex 3 | 9 | 9 |
| 8 | Vertex 5 | 4 | 4 |
| 9 | Vertex 4 | 13 | 13 |
| 10 | Vertex 8 | 6 | 6 |
| 11 | Vertex 7 | 8 | 8 |
| 12 | Vertex 10 | 5 | 5 |
| 13 | Vertex 9 | 7 | 7 |
| 14 | Vertex 14 | 14 | 14 |

| Base Index | Vertex | Forward Index | Backward Index |
|---|---|---|---|
| 1 | Vertex 13 | 6 | 4 |
| 2 | Vertex 1 | 1 | 1 |
| 3 | Vertex 2 | 3 | 3 |
| 4 | Vertex 3 | 7 | 5 |
| 5 | Vertex 4 | 9 | 6 |
| 6 | Vertex 12 | 14 | 13 |
| 7 | Vertex 11 | 8 | 11 |
| 8 | Vertex 10 | 5 | 8 |
| 9 | Vertex 14 | 4 | 15 |
| 10 | Vertex 9 | 2 | 2 |
| 11 | Vertex 5 | 10 | 7 |
| 12 | Vertex 6 | 11 | 9 |
| 13 | Vertex 7 | 13 | 12 |
| 14 | Vertex 8 | 15 | 14 |
| 15 | Vertex 15 | 12 | 10 |

STORAGE OF A GRAPH

The invention relates to a method for storing a graph in a computer memory, a method of graphical representation of a graph, and a computer system for storing a graph.

Graphs show relationships between objects. They are often used to model or represent a real process, sequence or structure. Graphs are used in particular to represent networks, such as transport or communications networks.

The state of the art not only includes the use of graphs for the representation and modelling of a real system comprising various objects which are separated from each other, at least logically; it also includes the use of graphs for analytical purposes. Fundamental examples of this are to be found in "Foundations of Computer Science, Computer Science Press, Alfred V. Aho, Jeffrey D. Ullman" and in "Introduction to Algorithms, The MIT Press, Thomas H. Cormen, Charles E. Leiserson, Ronald L. Rivest".

The practical application of graphs is, however, problematic, because the state of the art contains no practicable method of mapping a graph in such a way that the topography of the graph can be automatically processed by a computer. Likewise, the problem of clearly defined representation—especially of a complex, three-dimensional graph—on the limited flat area of a computer screen also remains unsolved.

The object of the invention is therefore to create a method of mapping a graph into a computer memory, as well as a computer system to execute the said method.

The objects are achieved with the characteristics of claims 1 or 9 and 11 respectively.

The method in accordance with the invention permits a graph to be represented by means of an array of indices. These indices can be stored in the computer memory so that the graph can be analysed by the computer. For example, the question as to whether there is a relationship between a first node—in the remaining vertex—and a second vertex can be answered by a simple comparison of the indices in the memory. Likewise, the vertices lying on a path from a first vertex to a second vertex in the graph can be determined by such comparisons. The question of a shortest path between two vertices, too, can be answered by comparison in this way. The method in accordance with the invention has the further advantage that the number of operations to be performed to determine the arrays describing the graph to be stored in the memory only increases linearly with the number of vertices and the edges of the graph.

In addition to the areas cited at the beginning, fields of application of the invention include control flow analysis, data flow analysis, modelling of business processes and of hardware and software configurations, and network modelling.

The invention offers particular advantages for computer graphics. If the arrays located by application of the method are interpreted as coordinates of the vertices in a coordinates system, they produce an ordered representation of the graph in several layered planar sub-graphs.

An embodiment of the invention is shown in the drawing, and is described in more detail in the following.

Figures 6A, 6B:
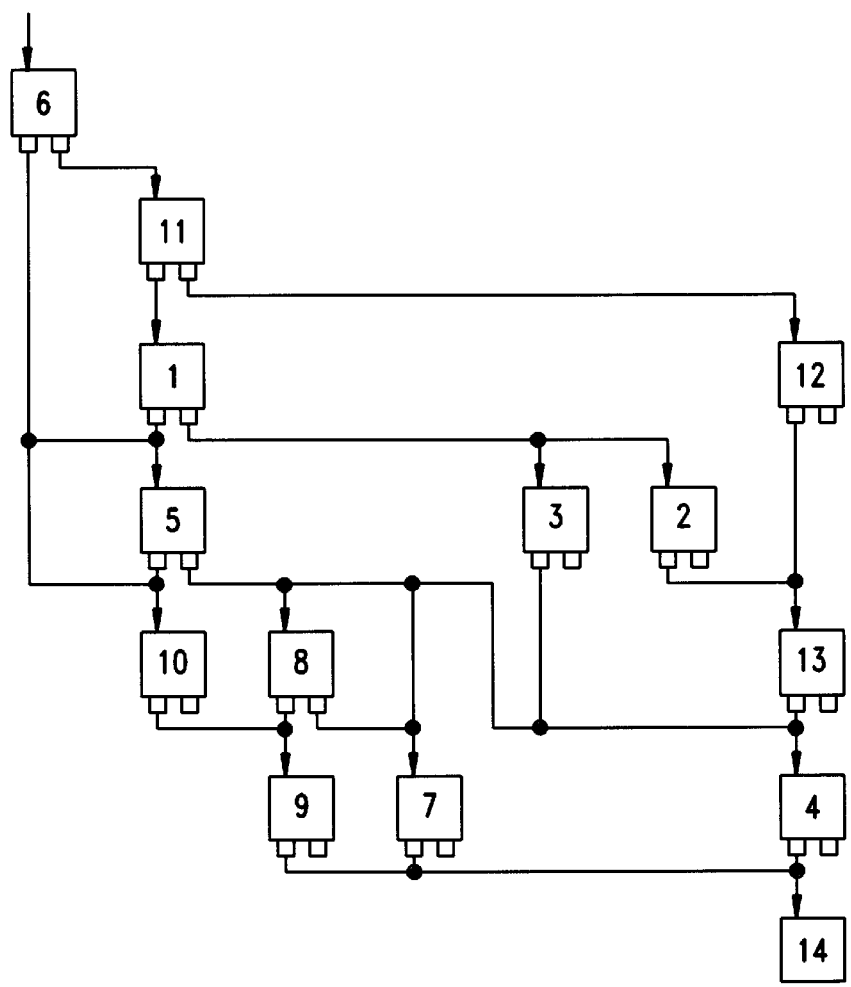
Figures 7A, 7B:
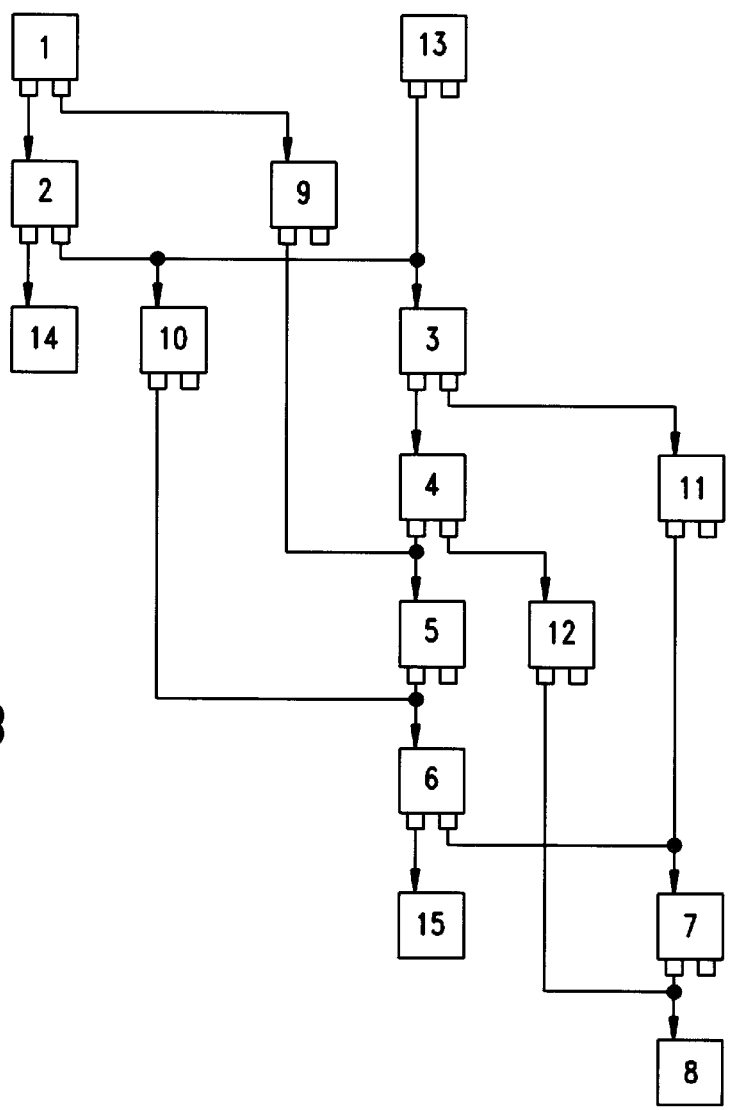

FIG. 1 shows a graph G;

FIG. 2A–O show the determining of a first map of the graph G;

FIG. 3A–B show the determining of a second map of the graph G;

FIG. 4A–B show the determining of a third map of the graph G;

FIG. 5 shows the located arrays of the map of graph G;

FIG. 6A–B show another graph G' and the associated arrays of indices;

FIG. 7A–B show another graph G" and the associated arrays of indices.

For depth-first searching in the graph G, the following algorithm is to be applied in this embodiment of the invention:

Initially the global variables of the algorithm are defined:

Pre-clock; the pre-clock initial value is equal to 0.

Post-clock; the post-clock initial value is the number of vertices of graph G, if the depth-first search occurs in forward direction; otherwise the initial value is equal to 0.

A stack of the vertices currently being processed; the initial contents of the stack are all vertices on which the depth-first search can be started, the so-called sources of graph G, if the depth-first search occurs in forward direction; otherwise the initial contents are the so-called sinks of graph G.

A data field for storing a vertex currently being processed, hereafter called the current vertex.

For each vertex the following local variables are defined:

A list of the successors of the vertex in question, with successors being designated as all those vertices directly related to the vertex in question. In the list of successors there is a pointer. Prior to execution of the depth-first search the pointer is located before the first element in the successor list.

A data field for storing the variable "pre-order"; the pre-order value is initially equal to 0.

A field for storing "post-order"; the post-order value is initially equal to 0.

The depth-first search algorithm involves the following steps:

1. If the stack is empty:
    a) Go to step 8
2. If the stack is not empty:
    a) Select vertex (u) at start of stack as current vertex
    b) Go to step 3
3. If the data field of the pre-order number of the current vertex (u) is not equal to 0:
    a) Go to step 5
4. If the data field of the pre-order number of the current vertex (u) is equal to 0:
    a) Increment pre-clock by 1
    b) Copy content of pre-clock into data field of pre-order number of current vertex (u)
    c) Go to step 5
5. If the pointer in the successor list of the current vertex (u) is at the end of the successor list:
    a) Copy content of post-clock into data field of post-order number of vertex (u)
    b) Decrement post-clock by 1
    c) Remove vertex (u) from stack
    d) Go to step 1
6. If there is a vertex (v) to the right of the pointer in the successor list of the current vertex (u) and the pre-order number of the vertex (v) is equal to 0:
    a) Add vertex (v) to start of stack
    b) Move pointer one position to right
    c) Go to step 1
7. If there is a vertex (v) to the right of the pointer in the successor list of the current vertex (u) and the pre-order number of the vertex (v) is not equal to 0:

a) Move pointer one position to right
b) Go to step 5

8. End depth-first search.

On termination of the depth-first search the data structures defined at the beginning contain the following results:

The global variables:

The pre-clock contains the number of vertices in the graph G.

The post-clock is equal to 0, if the depth-first search occurs in forward direction; otherwise equal to the number of vertices "n" of graph G.

The stack is empty.

The local variables in each vertex:

The pointer in the successor list is at the end of the list.

The pre-order number includes the pre-clock value at the point in time when the vertex in question was discovered.

The post-order number includes the post-clock value at the point in time when the vertex in question was removed from the stack or, in other words, at the point in time when processing of the vertex in question was completed.

For breadth-first searching, the following algorithm is applied in this example:

Definition of data structures used:

Global variable:

Proc-clock; the proc-clock value is initially equal to 0.

A queue of the vertices currently being processed; "queue" initially contains all vertices on which the breadth-first search can be started. These are the sinks of graph G; if the breadth-first search occurs in forward direction these are the sources of graph G.

A data field for storing the vertex currently being processed; that is, the current vertex.

Local variable for each vertex:

A successor list with a pointer, which is initially positioned to the left of the first vertex in the successor list.

A data field for storing the processing order; the processing order value is initially equal to 0.

A data field for storing the processing state; the processing state value initially has a first logical value —hereafter called "white".

The breadth-first search involves the following steps:

1. Change the processing state of all vertices in the queue to a second logical value—hereafter called "black".
2. If the queue is empty:
    a) Go to step 7
3. If the queue is not empty:
    a) Select vertex (u) at start of queue as current vertex
    b) Increment proc-clock by 1
    b) Copy content of proc-clock into data field of processing order variable of current vertex (u)
    c) Go to step 4
4. If the pointer in the successor list of the current vertex (u) is at the end of the successor list:
    a) Remove vertex (u) from queue
    b) Go to step 2
5. If there is a vertex (v) to the right of the pointer in the successor list of the current vertex (u) and the processing state of the vertex (v) is white:
    a) Add vertex (v) to end of queue
    b) Change processing state of vertex (v) to black
    c) Move pointer one position to right
    d) Go to step 4
6. If there is a vertex (v) to the right of the pointer in the successor list of the current vertex (u) and the processing state of the vertex (v) is black:
    a) Move pointer one position to right
    b) Go to step 4
7. End breadth-first search.

On termination of the breadth-first search the data structures defined at the beginning contain the following results:

The global variables:

The proc-clock contains the number of vertices in the graph G.

The queue is empty.

The local variable in each vertex:

The pointer in the successor list is at the end of the list.

The processing order includes the proc-clock value at the point in time when the vertex to which the processing order belongs was selected for processing.

The logical processing state is black.

Apart from the algorithms for depth-first and breadth-first searching described above, the state of the art also reveals a multiplicity of equivalent algorithms, which are likewise suitable for use in a method in accordance with the invention.

FIG. 1 shows a graph G, to which an embodiment of the method in accordance with the invention is to be applied. Graph G consists of vertices A, B, C, D, E, F, G, K, L, M, N, P, R, S and the associated edges, as shown in FIG. 1 at the top.

Graph G in FIG. 1 is to be represented by indices stored in a memory, e.g. of a computer, by means of the method in accordance with the invention. To this end, the graph G is subjected to a first mapping, on the basis of a total of five depth-first searches and one breadth-first search:

Depth-first search number 1: Graph G is subjected to a depth-first search in forward direction, wherein the successors of the vertices can be arranged consecutively, in any order; in the example, in alphabetical order. The result of the first depth-first search is a topological ordering of graph G.

FIG. 2a shows the initial values of the data structures used. The pre-clock initial value is equal to 0; the post-clock initial value is equal to 15. There is initially no current vertex. The stack contains only source A of graph G. The first column in FIG. 2a shows the vertices of graph G; the second column the successors belonging to the vertex in question in graph G; the third column the pre-order number of each vertex; and the fourth column the post-order number of each vertex.

FIG. 2b shows the individual steps of the depth-first search algorithm worked through in depth-first search 1. FIG. 2b shows only those steps of the algorithm which are actually performed, and the corresponding data thereby modified. The numbering of the steps in FIG. 2b corresponds to the numbering in the algorithm described above; as indeed a uniform numbering scheme is observed throughout.

FIG. 2c shows the result of depth-first search 1. The pointers in the successor list, as also in FIG. 2a, are symbolised by a "+". The pointers of all vertices are positioned at the extreme right margin of the successor list after completion of depth-first search 1.

FIG. 2d shows the data structures used for the subsequent breadth-first search in graph G in forward direction. The proc-clock is equal to 0; a current vertex is not yet defined, since processing has not yet begun; the queue contains source A of graph G. The first column of FIG. 2d contains the list of vertices; the second column the list of successors of each vertex; the third column the processing order; the fourth column the logical processing state "State", which is initially "white".

Execution of the breadth-first search is based on the result of the depth-first search 1, because the successor lists are sorted according to the post-order found in depth-first search 1. This means that the successor list of each vertex is sorted according to the post-order found in depth-first search 1, in descending order. The vertex in a successor list which has the highest post-order number on completion of the first depth-first search is placed accordingly at the start of the successor list. FIG. 2e shows the execution of the breadth-first search based on the algorithm described above, wherein once again the numbering of the individual steps in FIG. 2e corresponds to the steps in the breadth-first search algorithm described.

FIG. 2f shows the data structure of FIG. 2d on completion of the breadth-first search.

Thereafter, based on the result of the breadth-first search, another depth-first search is performed in graph G. Depth-first search 2 is performed in the opposite direction, i.e. in backward direction. In comparison with depth-first search 1, this requires the successor lists to be replaced by corresponding lists of predecessors for each vertex. The second column in FIG. 2g accordingly shows the predecessors of each vertex in graph G. For example, vertex F has predecessors B, G, N, as can also be seen in FIG. 1. The predecessor list in FIG. 2g is sorted on the basis of the result of the breadth-first search. Each predecessor list is sorted according to the ascending processing order in FIG. 2f, i.e. the vertex in a predecessor list with the lowest processing order is positioned at the start of the predecessor list, followed by the remaining vertices of the list, in ascending order.

FIG. 2h shows the execution of the depth-first search in backward direction in graph G, wherein once again the numbering of the steps in FIG. 2h corresponds to the steps of the depth-first search algorithm previously described. The difference between this and the depth-first search algorithm previously described is only that—in accordance with the change of direction in the second depth-first search—the successors have been replaced by the predecessors of a vertex.

FIG. 2i shows the data structure of FIG. 2g on completion of the second depth-first search.

Based on the result of the second depth-first search, a third depth-first search is then performed in forward direction, wherein the successors in the successor lists of each vertex are sorted in descending pre-order; the basis is the pre-order found in the second depth-first search (cf. column 3 in FIG. 2i). FIG. 2k shows the data structure of FIG. 2j on completion of the third depth-first search in forward direction. Based on the result of the third depth-first search, a fourth depth-first search is then performed in backward direction, wherein the predecessors of the vertices are sorted in descending post-order prior to execution of the depth-first search (FIG. 2i). Again, the bases for the search are the post-order numbers found in the preceding depth-first search (cf. column 4 in FIG. 2k).The result of the fourth depth-first search is shown in FIG. 2m.

Based on the fourth depth-first search in backward direction, a fifth depth-first search is then performed in forward direction. Again, prior to execution of the fifth search the successor lists of the vertices are sorted in ascending post-order (FIG. 2n); the bases are the post-order numbers found in the fourth depth-first search (cf. column 4 in FIG. 2m). FIG. 2o shows the result of the fifth depth-first search in forward direction. The post-order numbers determined in the fifth depth-first search (cf. column 4 in FIG. 2o) are the map of graph G. This map is designated hereafter as the base index "BsIndex". Vertex A, for example, has been assigned index 1 as a result of the first mapping of graph G; vertex B index 4; vertex C index 2; . . . in accordance with column 4, "BsIndex", in FIG. 2o.

Based on the BsIndex found, two more maps of graph G can be located by means of one further depth-first search for each.

To locate a second map—hereafter designated the forward index "FwdIndex"—the graph G is subjected to a further depth-first search in forward direction. The successors in the successor list of each vertex are sorted according to the BsIndex prior to execution of the sixth depth-first search, in ascending order. The successor in a successor list with the lowest BsIndex is thus positioned at the start of the successor list. This produces the data structure shown in FIG. 3a. Based on this data structure, the sixth depth-first search is performed in forward direction according to the algorithm set out above. The result is the data structure in FIG. 3b. The post-order numbers of the vertices represent the searched-for forward index "FwdIndex". For example, the FwdIndex of vertex A is equal to 1; that of B equal to 9; . . . (in accordance with column 4 in FIG. 3b).

By means of a seventh depth-first search in backward direction a third map of graph G is determined: the so-called backward index "BwdIndex". The predecessors in the predecessor list of each vertex are first sorted in descending order according to their respective base index "BsIndex" (cf. column 4 in FIG. 2o). The vertex in a predecessor list with the highest base index is thus positioned at the start of the list. This sorting of predecessors produces the sort as shown in column 2 of FIG. 4a. The execution of the seventh depth-first search in backward direction based on the algorithm set out above produces the result shown in FIG. 4b. The post-order number of each vertex indicates its backward index "BwdIndex" (cf. column 4 in FIG. 4b).

The results of the above three mapping operations of graph G are assembled in FIG. 5. The first column in FIG. 5 gives the base index "BsIndex"; the third column the forward index "FwdIndex"; and the fourth column the backward index "BwdIndex" of the vertices of the graph G. The vertices of graph G are listed in column 2 of FIG. 5. For each of the listed vertices this results in an index array comprising base index, forward index and backward index. For example, array (1, 1, 1) is allocated to vertex A; array (7, 13, 13) to vertex E.

FIG. 5 shows that, for graph G in FIG. 1, the forward and backward index are equal for each vertex. The unambiguous consequence of this is that graph G is a planar graph. FIG. 6b shows another non-redundant planar graph G'. Graph G' is redundant in that it contains no edges representing "shortcuts". A "shortcut" in this context would be an edge between vertex 11 and vertex 5. An edge of this kind is, however, redundant, because the information that a relationship exists between vertex 11 and vertex 5 is already included in graph G' without that edge. This information is given by the indirect relationship between those vertices by way of vertex 1 in graph G'. If this redundant edge was present in graph G', it would be eliminated by a mapping operation in accordance with the invention.

FIG. 6a shows the results of the mapping operations in accordance with FIG. 5. Since, again, the forward and backward index of graph G' in FIG. 6b are equal, graph G' is consequently also planar.

FIG. 7b shows a graph G"; FIG. 7a the associated result of mapping in accordance with FIG. 5. In this case the forward and backward indices are different. The unambiguous consequence of this is that graph G″ in FIG. 7b is a non-planar graph. This means that graph G″ cannot be represented in one plane without the intersection of two of its edges.

This method of mapping a graph G into a storage device—in particular a computer system memory—thus merely requires that the vertices, the edges, the sources and the sinks (cf. FIG. 1 at the top) be entered in the computer. The method of mapping graph G is then performed according to the algorithms set out above by means of electronic data processing, resulting in the storing in the computer memory of a number array for each vertex of the graph. The totality of the number arrays located by this means includes the entire topological information which is contained in a graph G. With the aid of the map of a graph G as located, that is to say with the number arrays for each of its vertices, the following questions can, for example, be answered directly:

1. It is a linear graph if BsIndex=FwdIndex=BwdIndex.
2. It is a planar graph if BsIndex is not equal to FwdIndex=BwdIndex.
3. It is a non-planar graph if all three indices are unequal for a vertex of the graph.
4. There is a relationship between any first vertex A and any second vertex B of graph G when
   a) BsIndex of vertex A<BsIndex of vertex B
   b) FwdIndex of vertex A<FwdIndex of vertex B
   c) BwdIndex of vertex A<BwdIndex of vertex B.

If the first depth-first search is performed not in forward direction but in backward direction, the size ratios are reversed accordingly, i.e. "<" becomes ">".

5. In the case of a planar graph, conditions b) and c) are equal; in the case of a linear graph all three conditions are equal, so that it merely remains to check whether the BsIndex of vertex A is lower than the BsIndex of vertex B. The answer to the question of whether a relationship exists between vertex A and vertex B in graph G requires only a low level of computing power of the computer system. To answer the question, the three mapped indices of vertex A and of vertex B must merely be compared with each other. A further advantage of the method in accordance with the invention is that the established result that a relationship exists between vertex A and vertex B is not subject to uncertainty, as would be the case according to the current state of the art.
6. The sequences of relationships, symbolised by edges in graph G, result in so-called paths. Based on the mapping of graph G, all vertices belonging to a path from any vertex A to any vertex B can be determined. For this, all vertices having a relationship both with vertex A and with vertex B must be determined.
7. By means of the method in accordance with the invention, a shortest path Pmin from a vertex A to a vertex B can be located, if conditions 4a–b are applied recursively:
   a) For each path P from A to B only those vertices Vi come into question of which the BsIndex is higher than the BsIndex of A but lower than the BsIndex of B.
   b) Establish, for each of these vertices Vi in ascending order of base indices, the following:
      aa) Is there a relationship between vertex Vi and vertex B? If not, vertex Vi cannot belong to a path from A to B. The next vertex Vi+1 with the next highest BsIndex is then checked.
      bb) If condition aa) is met: Is there a relationship between a vertex Vj, which belongs to a path Pj, and the current vertex Vi being checked? As long as no such vertex Vj has yet been found, this is vertex A. If that is the case, the vertex currently being checked Vi likewise belongs to the path Pj. Since vertex Vj is the vertex in path Pj with the highest BsIndex, it is also ensured that the vertex currently being checked Vi immediately follows vertex Vj in path Pj. The vertex currently being checked Vi, which belongs to the path Pj, then in a further recursion becomes vertex Vj in the execution of step b)—in particular bb)—for this vertex.

If there is no relationship between vertex Vj in path Pj and vertex Vi, with Vj and Vi having minimal differences in their BsIndex, a check must be made as to whether there are other paths Pj+1 to which the vertex currently being checked Vi belongs. To do this, a check must be made for the last vertex V found in each of the other paths P, that is to say for the respective vertices V with the highest BsIndex, as to whether there is a relationship between the said vertex V and the vertex currently being checked Vi. If that is the case, vertex Vi consequently immediately follows the last located vertex V in the relevant path P.

c) Determination of the length of all located paths, where appropriate taking account of numeric information relating to the relationships. If graph G represents a computer network, for example, then the numeric information relating to the individual relationship between two vertices can give information on the line length, for example.

d) Determine from the path lengths determined under c) the path of the shortest length Pmin.

The storage in a computer system memory created by the mapping in accordance with the invention can be advantageously used for the graphical representation of graph G, for example on a monitor of the computer system. If the individual arrays of indices are interpreted as coordinates of the vertex in question in a coordinates system, the planar sub-graphs in graph G are represented in one plane. The resulting different planes are interlinked on specific vertices. These vertices can be represented in tubular form, for example.

This ensures a clear, concise and memory-saving form of representation.

The method in accordance with the invention is also not restricted to acyclically directional graphs. It can also be applied to non-directional graphs, if a direction is simulated in a non-directional graph by means which are in themselves already known.

A further advantage of the method in accordance with the invention results from the fact that the located map of graph G has no redundancy whatever in the memory. This can, however, also be seen as disadvantageous—especially in determining a shortest path. If, for example, there were a relationship between vertices A and L in the graph in FIG. 1, that relationship would no longer be expressed in the established arrays of indices. If the information that there is a direct relationship between vertices A and L is of significance, and the information contained in the map indicating that such a relationship exists by way of vertex C is not sufficient, the following remedial action can be taken:

On completion of a first storing of the graph in accordance with the invention, the edges eliminated in the process of mapping are identified. These are the redundant edges. Notional nodes are inserted in the edges eliminated as a result of the mapping. After insertion of the notional nodes into the graph, the method in accordance with the invention is performed for a second time, with the redundant edges being retained.

The method in accordance with the invention can be integrated into an operating system as a library program. When a storage medium, such as a diskette or a CD-ROM, is inserted into the computer system reading device, a computer system is created which is able to execute the method in accordance with the invention.

I claim:

1. Method for storage of a graph of vertices and associated edges connecting pairs of said vertices in a memory of a computer system as a table of the vertices and a group of indexes ordering the vertices, characterized by the steps of:

a) representing the graph as a list of the vertices and a list of successors of each vertex;

b) performing a depth first search in graph G in a first direction;

c) performing a breadth-first search in graph G in the first direction; and d) performing four further depth-first searches in graph G alternately in a second direction and the first direction to produce a first map (BsIndex), wherein the breadth-first and depth-first searches in steps c) and d) are each based on the result of the preceding search.

2. Method in accordance with claim 1, characterized in that prior to the searches in steps c) and d) the lists of successors of each vertex of graph G are sorted according to the result of the preceding search.

3. Method in accordance with claim 2, characterized in that the graph G contains a shortcut between two of its vertices, and a vertex is introduced into the edge of graph G corresponding to the shortcut.

4. Method in accordance with claim 1, characterized by the following steps:

a) performing a depth-first search in the first direction in graph G based on the first map (BsIndex) for creation of a second map (FwdIndex);

b) performing a depth-first search in the second direction in graph G based on the first map (BsIndex) for creation of a third map (BwdIndex).

5. Method in accordance with claim 4, characterized in that prior to the searches in steps a) and b) of claim 4 the lists of successors of each vertex of graph G are sorted according to the first map (BsIndex).

6. Method to ascertain whether in a graph G a relationship exists between a first vertex A and a second vertex B, wherein graph G is stored in a memory by means of a first, second and third mapping in accordance with claim 4, characterized in that the indices X (BsIndex) of the first map, Y (FwdIndex) of the second map, and Z (BwdIndex) of the third map of vertices A and B are each read from the memory, and that a check is made as to whether the indices X, Y, Z of vertices A and B respectively have a pre-determined size ratio to each other.

7. Method to ascertain a shortest path Pmin from a vertex A to a vertex B of a graph G, characterized in that the method in accordance with the invention is applied recursively in accordance with claim 6.

8. Method to ascertain all vertices belonging to a path from a vertex A to a vertex B in graph G, wherein graph G is stored in a memory by means of a first, second and third mapping in accordance with claim 4, characterized in that the indices X (BsIndex) of the first map, Y (FwdIndex) of the second map, and Z (BwdIndex) of the third map of vertices A and B are each read from the memory, and that all vertices of graph G are ascertained of which the indices lie between the indices of vertices A and B.

9. Method for graphically representing a graph G, characterized in that the maps of graph G located by means of a method in accordance with claim 1 serve to determine the coordinates of the vertices of graph G.

10. Computer system with means of executing a method in accordance with claim 1.

11. Storage medium for a computer system, characterized in that a computer program for executing a method in accordance with claim 1 is stored on said storage medium, such that when the storage medium is inserted into the computer system a computer system in accordance with claim 10 is created.

12. Method for storing a graph G in a computer memory, characterized in that, for each vertex Vi of graph G, an array of indices is stored in the memory and the array of indices of a vertex Vj stands in a pre-determined ratio to the corresponding array of indices of a vertex Vk when a relationship exists in graph G between vertices Vj and Vk.

13. A method of storing a graph of vertices and associated edges connecting pairs of said vertices in a memory of a computer system, comprising the steps of:

representing the graph as a list of the vertices and a group of successor/predecessor lists of the vertices, each successor/predecessor list being associated with one of the vertices and representing the edges of the graph connecting the associated vertex in a first direction to the succeeding/preceding vertices listed in the associated successor/predecessor lists;

topologically ordering the vertices by performing a sequence of searches in the graph, each successive search in the graph being performed using an ordering of the vertices in each of the successor/predecessor lists produced in accordance with an ordering of the vertices generated by the next preceding search;

forming a first map of the graph containing a base index for each vertex of the graph from the ordering of vertices produced by the sequence of searches;

forming a second map of the graph containing a forward index for each vertex of the graph by performing a depth-first search in the graph in forward direction with the successor/predecessor lists of vertices each being sorted in accordance with the base indexes of the vertices in ascending order;

forming a third map of the graph containing a backward index for each vertex of the graph by performing a depth-first search in the graph in backward direction with the successor/predecessor lists of vertices each being sorted in accordance with the base indexes of the vertices in descending order;

forcing a table of the vertices containing the base index, forward index and backward index for each of the vertices; and storing the formed table as a stored representation of the graph.

14. A method as defined in claim 13 wherein the sequence of successive searches in the topologically ordering step comprises the steps of performing a first depth-first search in the first direction, followed by a breadth-first search in the first direction, followed by a second depth-first search in a second direction, followed by a third depth-first search in the first direction, followed by a fourth depth-first search in the second direction, followed by a fifth depth-first search in the first direction.

* * * * *